United States Patent [19]

Sparber

[11] 4,331,913
[45] May 25, 1982

[54] PRECISION NEGATIVE IMPEDANCE CIRCUIT WITH CALIBRATION

[75] Inventor: Richard G. Sparber, Wheaton, Ill.

[73] Assignee: Bell Telephone Laboratories, Incorporated, Murray Hill, N.J.

[21] Appl. No.: 193,366

[22] Filed: Oct. 2, 1980

[51] Int. Cl.³ ............................................. G05F 5/00
[52] U.S. Cl. ................................ 323/303; 307/296 R; 324/62; 323/315
[58] Field of Search ............... 307/296; 323/303, 315; 324/62, 64

[56] References Cited

U.S. PATENT DOCUMENTS

| | | | |
|---|---|---|---|
| 3,310,737 | 3/1967 | Ripper | 324/62 R |
| 3,835,410 | 9/1974 | Wittlinger | 330/19 |
| 3,952,257 | 4/1976 | Schade, Jr. | 330/22 |
| 3,969,637 | 7/1976 | Minami et al. | 307/296 X |
| 3,986,152 | 10/1976 | Howell | 323/315 X |
| 4,045,746 | 8/1977 | Wheatley, Jr. | 330/23 |
| 4,065,726 | 12/1977 | Senger | 330/23 |
| 4,186,282 | 1/1980 | Ellson | 324/62 X |

Primary Examiner—William M. Shoop
Attorney, Agent, or Firm—P. Visserman

[57] ABSTRACT

A negative impedance circuit comprising a level shifter and a current mirror, includes calibration circuitry for adjusting the negative impedance to provide the precise amount of current required to compensate for current drain caused by a known impedance at varying voltage levels. A divider/multiplier circuit is connected to the line which has the known impedance and provides a signal which is directly proportional to the voltage level on the line to the level shifter which, in turn, provides a corresponding control current to the current mirror. The current mirror provides a proportional current to the line current supplied by the current mirror and may be measured at a calibration resistor and the divider multiplier circuit may be adjusted to the appropriate ratio until the exact amount of current required to offset the drain to the precision resistor is provided by the current mirror.

19 Claims, 3 Drawing Figures

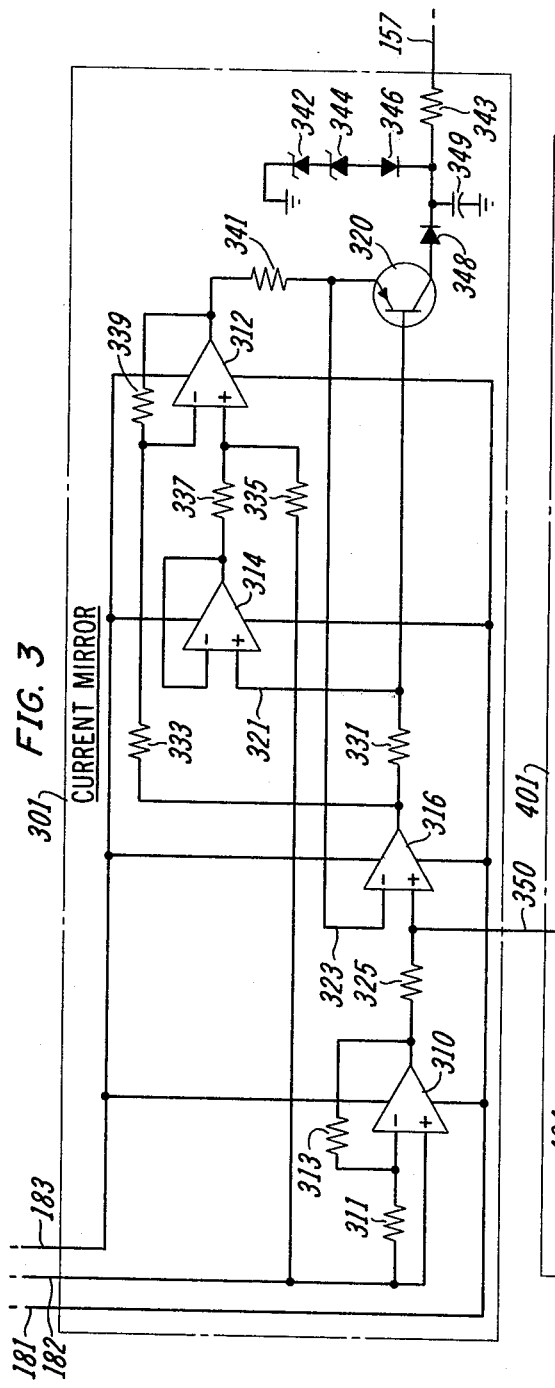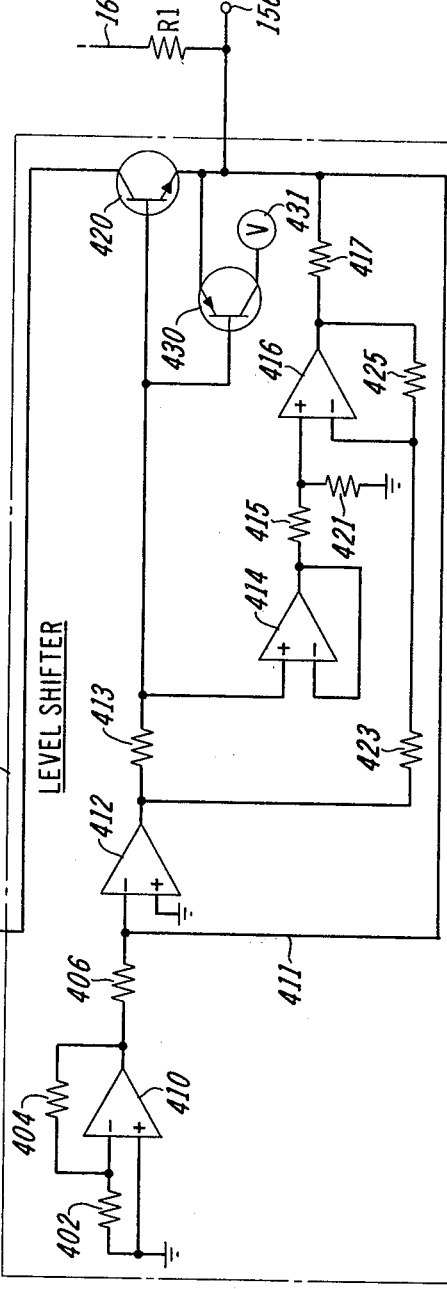

PRECISION NEGATIVE IMPEDANCE CIRCUIT WITH CALIBRATION

TECHNICAL FIELD

The invention relates to negative impedance circuits and more specifically to a negative impedance circuit for supplying varying currents to a load for varying supply voltages.

BACKGROUND OF THE INVENTION

In certain telephone systems employing so-called floating subscriber lines, a bias network is connected to the tip and ring conductors of each subscriber line keeping the tip and ring at a negative potential as a guard against corrosion. However, in subscriber line testing, which is routinely performed in telephone systems, the bias network tends to interfere with line impedance measurements and to prevent accurate measurement of line leakage. Any attempt to disconnect the bias network from the line during testing, results in the addition of a substantial number of circuit elements for each line, increasing significantly the per-line costs.

SUMMARY OF THE INVENTION

In accordance with this invention, a highly accurate negative impedance circuit which is linear over a large voltage range and comprising essentially a voltage controlled current source, referred to as a level shifter, and a current controlled current mirror circuit, is used to cancel the effect of a current drain which may be caused by an impedance circuit such as the subscriber line bias network. The negative impedance circuit senses the line voltage, which may vary with time, and supplies a current to the line which is directly proportional to the line voltage. A divider/multiplier, used as a level adjusting and calibration circuit and comprising an adjustable voltage divider and an amplifier, may be connected between the line and the level shifter to provide an adjusted line voltage to the level shifter. The negative impedance circuit may be calibrated by measuring current to a calibration resistor and adjusting the voltage divider accordingly. The divider/multiplier circuit is connected to the level shifter at a common node through a resistor R1 together with a fixed voltage source connected to the common node through a resistor R2. The level shifter has a transistor circuit connected to the common node which is controlled to maintain the common node at a predetermined voltage level (e.g., ground) as a current flow through resistor R1 varies with variations in line voltage. The level shifter provides a control current to the current mirror corresponding to the current required to keep the common node at the predetermined potential. In this manner, the current mirror which provides an output current directly proportional to its input control current, is controlled to provide to the connected line a current which is directly proportional to the line voltage.

In accordance with one aspect of this invention, the control current produced by the level shifter and the output current of the current mirror are accurately controlled. The level shifter and current mirror circuits each comprise an output transistor and compensating circuitry which measures the magnitude of the base current and provides a corresponding, compensating current to assure that the transistor collector current is substantially equal to the emitter current independent of the magnitude of the base current. The level shifter and current mirror preferably are each constructed of semiconductor devices on a single chip and compensation circuitry is provided to compensate for voltage offset introduced in the semiconductor devices. In accordance with another aspect of this invention, a controlled voltage source controls the level of the power supply providing power to the current mirror at a level which is a predetermined amount higher than the line voltage level. This is provided to prevent large voltage differences across the current mirror with large variations in line voltage and maintains the operating range of circuit components of the current mirror within a prescribed substantially linear range thereby providing greater accuracy for the negative impedance circuit.

BRIEF DESCRIPTION OF THE DRAWING

The invention may be better understood from the following detailed description when read with reference to the drawing in which:

FIG. 2 and 3 show certain circuit details of the various blocks of the block diagram of FIG. 1.

DETAILED DESCRIPTION

Figure 1:
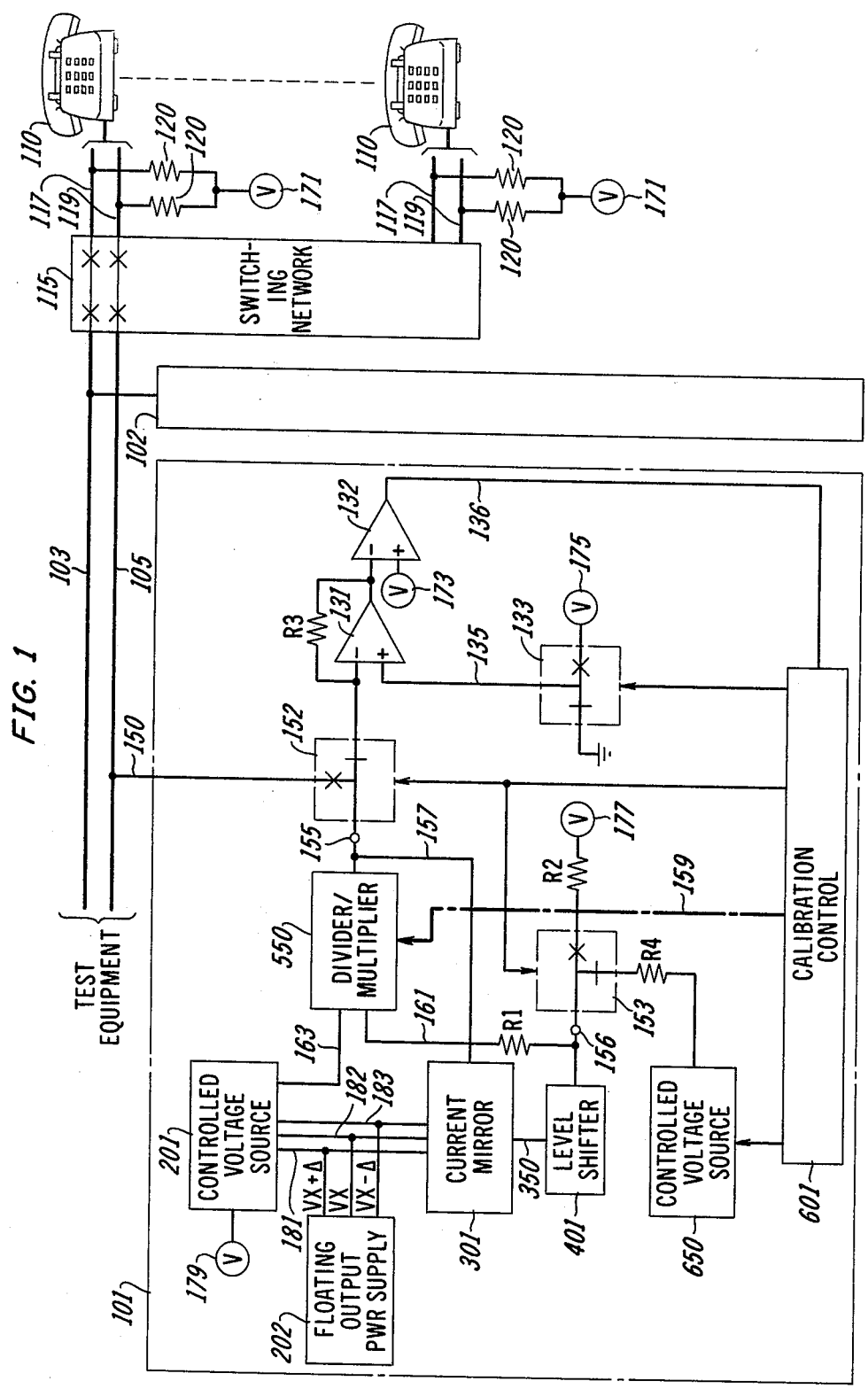
FIG. 1 is a block diagram representation of the circuit of the invention, shown as part of a switching system.

To aid in the understanding of the function of a negative impedance circuit in accordance with this invention, such a circuit is shown in FIG. 1 as part of a telephone switching system. FIG. 1 shows subscriber stations 110 connected to a switching network 115 by means of conductors 117 and 119 which may be the TIP and RING conductors, respectively, of the subscriber lines, which connect subscriber stations 110 to the network 115. Each of the TIP and RING conductors is connected to a bias network comprising a source of potential 171, and a resistor 120, connected between the conductors and the source 171. The source 171 may provide a potential of, for example, +96 volts. The resistors 120 are expected to be of high value, on the order of 100,000 ohms. The illustrative system of FIG. 1 may incorporate test equipment, not shown in the drawing, connected to the switching network 115 by means of conductors 103 and 105 and connectible to the subscriber line pairs (117, 119) by selective operation of the switching network 115. The illustrative system includes two identical negative impedance circuits, 101 and 102, which are connected to conductors 105 and 103, respectively. During testing, the negative impedance circuits each supply a current which is equivalent to the current that is expected to flow through the bias network resistor 120 connected between the line under test and the source of negative potential 171, thereby canceling the effect of the bias network. Circuit 101 will be described below. However, since circuit 102 is identical to 101, it will not be described further herein.

The negative impedance circuit 101 is connected to test line 105 by means of conductor 150, which is connected to the divider/multiplier circuit 550 and the current mirror circuit 301 through a contact of relay 152 at terminal 155. The divider/multiplier circuit 550 produces a scaled down input voltage proportional to the line voltage on conductor 150. The scaled down voltage is applied via conductor 161 to fixed resistor R1 which in turn is connected to level shifter circuit 401 at terminal 156. Terminal 156 is connected to resistor R2 via a contact of relay 153. Resistor R2 in turn is connected to a source of potential 177, which may be, for example, at the same negative potential level as the source 171 to which the bias resistors 120 are connected. Terminal 156 is maintained essentially at ground potential by means of level shifter 401, and the current in resistor R2 must equal the sum of the current in R1 and current supplied by level shifter 401. The voltage applied by circuit 550 is proportional to the negative of the line voltage on conductor 150, and the current in R1 will increase as the line voltage increases and vice versa. The level shifter 401 compensates for any change in current in R1 and supplies the amount of current required to provide the necessary current to R2. The level shifter 401 will draw a corresponding current from the current mirror circuit 301 which, in turn, will provide a current of proportional magnitude to the test line 105 by means of conductors 150 and 157. Accordingly, it may be seen that the current provided to the line 105 by the negative impedance circuit 101 is directly proportional to the level of the voltage occurring on the line 105.

The divider/multiplier 550 is connected via conductor 163 to controlled voltage source 201, which in turn is connected to a source of potential 179, having a high positive voltage which may be on the order of +300 volts. The controlled voltage source 201 in effect introduces a variable voltage drop between the source 179 and the current mirror supply voltage $V_x$ provided by floating power supply 202, such that the voltage difference between $V_x$ and test line 105 to which the current mirror is connected, is within a prescribed range. In this manner, the current mirror is protected against damage resulting from large voltage variations on test line 105. Furthermore, the controlled voltage difference aids circuit linearity over a large voltage range, since the semiconductor devices which supply the current to the test line are not directly affected by the voltage on the test line.

Further shown in FIG. 1 are several circuit elements used in the calibration of the negative impedance circuit 101. Such calibration would normally be done periodically to compensate for impedance variations which tend to occur. Calibration circuitry includes operational amplifiers 131 and 132 and a high precision resistor R3, for example, having less than 0.02 percent error. The nominal value of resistor R2 is the same as that of resistors 120, which in this illustrative system is 100,000 ohms. FIG. 1 shows a calibration control 601 which may be any circuit responsive to a control signal such as the output signal of operational amplifier 132 to operate relays and controls. The detailed circuitry of calibration control 601 is not shown in the drawing since it is well within the skill of any person of ordinary skill in the art to devise such a circuit. The calibration sequence and adjustments will be described in subsequent paragraphs with reference to the calibration control. However, it will be apparent that these adjustments could readily be carried out by a human operator with the aid of a volt meter and standard control devices, without the necessity of an autonomous calibration circuit.

During calibration procedure, relays 152 and 153 will be in the nonoperated state and terminal 155, which has connections to the divider/multiplier 550 and current mirror 301 will be disconnected from the test line 105 and will be connected to an input terminal of operational amplifier 131. Similarly, terminal 156, which has connections to resistor R1 and level shifter 401 will be disconnected from resistor R2 and source 177 and will be connected to the control voltage source 650 through resistor R4. In this particular embodiment, the resistor R4 has been chosen to be 121,000 ohms. The controlled voltage source 650 may be any commercially available variable voltage power supply. By adjustment of the divider/multiplier circuit 550 the negative impedance circuit is adjusted to be exactly equal to the negative of resistor R3, which is connected between the output terminal and the minus input terminals of operational amplifier 131. It has been observed that the current mirror 301 provides the exact amount of current required when the output voltage of the operational amplifier 131 becomes independent of the voltage applied to its plus input terminal via conductor 135. It is noted, that the amplifiers 131 and 132 are standard operational amplifiers having a plus and a minus input terminal. Amplifier 131 together with resistor R3, which is connected between the amplifier's minus input terminal and its output terminal, form essentially a current to voltage converter. Amplifier 132 having its minus input terminal connected to the output terminal of amplifier 131 and its plus input terminal connected to reference voltage source 173, acts as a comparator. Amplifier 132 will generate a high voltage level output signal when the voltage level at the plus input terminal exceeds the voltage level at the minus input terminal, and a low voltage level output signal when the inverse input condition exists.

Initially, in the calibration sequence relay 133 will be in the nonoperated state connecting the plus terminal of amplifier 131 to ground. To compensate for offset voltages in the various circuit devices, the output voltage of the controlled voltage source 650 is adjusted until the minus input terminal of amplifier 132 reaches a level equal to that of the plus input terminal, causing a change of state of the output signal of amplifier 132 on conductor 136. The plus input terminal of amplifier 132 is maintained at a small negative voltage, for example, −2 volts, by means of the source of potential 173. The next step in the calibration sequence is to operate relay 133, causing the plus terminal of amplifier 131 to be disconnected from ground and to be connected to a source of potential 175 having a positive voltage level, for example, +10 volts. As mentioned earlier, it can be shown that the output voltage of amplifier 131 will be independent of the voltage at its plus terminal when the current mirror 301 provides the desired amount of current. Thus, if a change in output signal is detected on conductor 136 after operation of relay 133, a circuit adjustment is required. This adjustment is obtained by the selective operation of relays in the divider/multiplier circuit 550, which is described in greater detail subsequently herein with respect to FIG. 2. Cable 159 connected between calibration control 601 and the divider/multiplier 550 represents a plurality of control conductors for the individual control of several relays in order to obtain appropriate adjustment of the divider/multiplier 550. The value of the divider/multiplier 550 is adjusted until a change of state is again detected on conductor 136. By changing the relay 133 from its operated to its nonoperated state, it can be determined whether an appropriate adjustment has been obtained. It has been determined that after four operational cycles of adjusting the divider/multiplier 550 and operating the relay 133, the equivalent value of the negative resistance circuit will be within less than 0.1 percent of the value of the high precision reference resistor R3.

Figure 2:
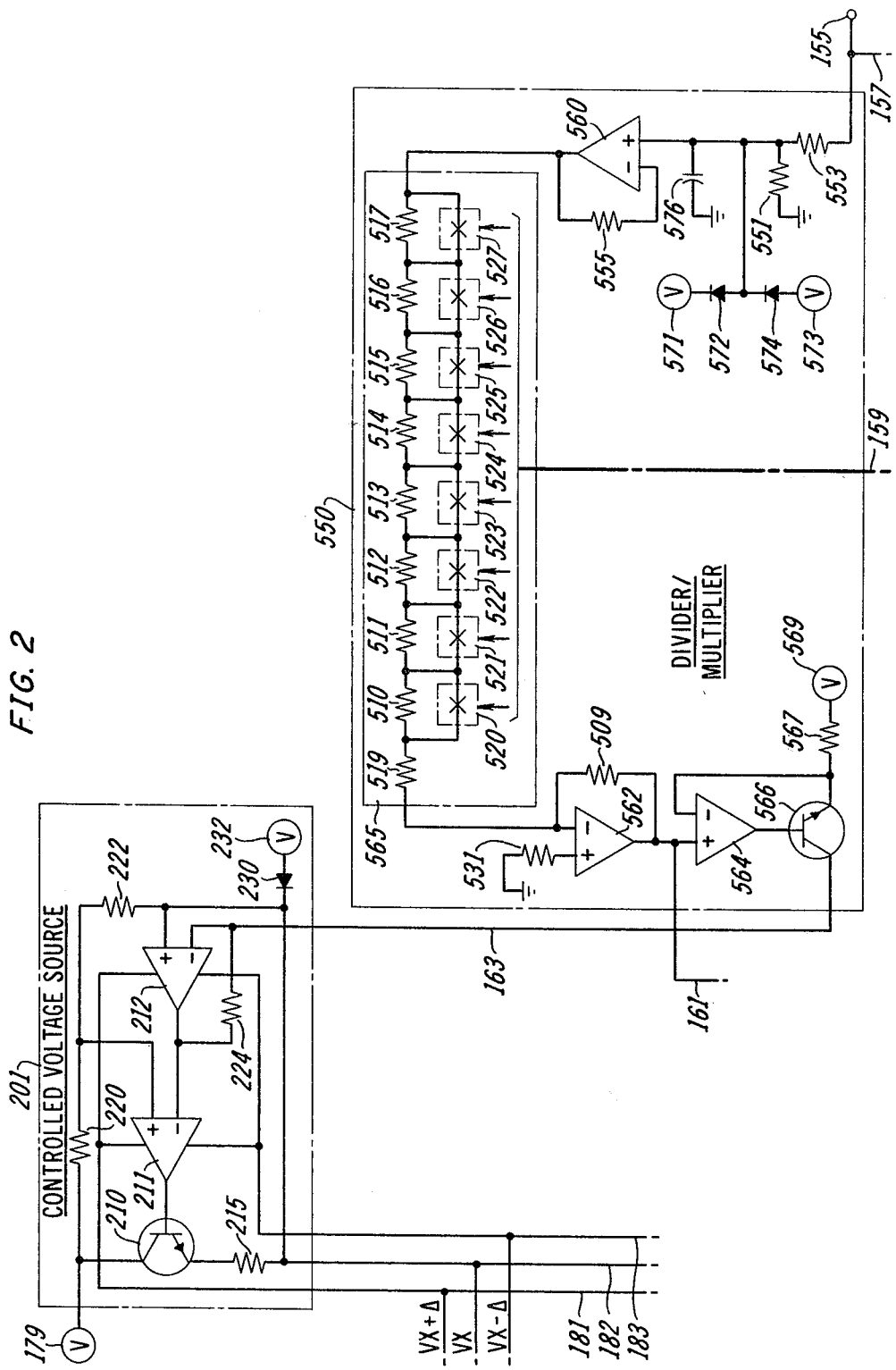

The divider/multiplier circuit 550 and the controlled voltage source 201 are shown in greater detail in FIG. 2. As explained earlier, the first circuit serves to scale down input voltage occurring on test line 105 and the other circuit serves to regulate the voltage applied to the current mirror 301. The test line voltage is applied via terminal 155, shown in FIG. 1, to a voltage divider circuit comprising the resistors 551 and 553. The junction point of these two resistors is connected to one input terminal of operational amplifier 560 which is used as a buffer circuit to provide a low output impedance signal for the divider circuit 565, consisting of resistors 510 through 517. The input terminal of operational amplifier 560 which is connected to the junction of resistors 551 and 553, is also connected to a grounded capacitor 576, to a positive voltage source 571, through diode 572 and to a negative voltage source 573 through diode 574. The voltage sources 571 and 573 may be selected to be +7.5 volts and −7.5 volts, respectively, to maintain the input terminal of operational amplifier 560 within a prescribed voltage range thereby protecting the circuit from excessive voltage swings which may occur on the test line to which it is connected. The resistors 551 and 553 are chosen such that the value of resistor 553 is large compared to that of 551 and maybe 25 to 30 times larger than that of resistor 551 causing the input voltage to be scaled down significantly. The capacitor 576 serves to reduce the effect of excessively fast voltage variation on test line 105, such as may result from lightning. Resistor 555, connected between the output terminal and the minus input terminal of amplifier 560 to reduce DC offset of amplifier 560.

The division factor of the divider circuit 565 may be varied by selective operation of the relays 520 through 527, from the calibration control 601, during the calibration processes explained earlier. The divider circuit is connected to the operational amplifier 562 which serves to buffer and invert the signal generated by the divider circuit. The amplified signal, which corresponds to the signal applied at the terminal 155, is applied to the resistor R1, shown in FIG. 1 via conductor 161. It is also used to generate a reference signal for the controlled voltage source 201 on conductor 163 by means of operational amplifier 564 and transistor 566. The resistors 510 through 517 of the divider circuit 550 are chosen to have various values in order to allow for appropriate adjustment. For example, in one arrangement the resistor 510 is chosen to be 6400 ohms and each of the subsequent resistors is chosen to be exactly one-half of the preceding resistor down to a 50 ohm value for resistor 517. In this arrangement, by selective operation of the relays 520 through 527, the resistance value of the divider circuit may be chosen to be anywhere from 50 ohms to 12,750 ohms, in 50 ohm increments. The resistance values of the resistors shown connected to operational amplifier 562, namely feedback resistor 509 and input resistors 519 and 531 may be chosen to provide a desirable output signal level for operational amplifier 562.

The output signal of operational amplifier 562 is applied to operational amplifier 564 which in turn drives an NPN transistor 566. The transistor 566 allows current flow from an input terminal of operational amplifier 212 and resistor 224, in the controlled voltage source 201, via conductor 163 and resistor 567 to a negative voltage source 569. The operational amplifier 212 has one input terminal connected to conductor 182 which is maintained at a potential referred to as $V_x$. It is the function of the control voltage source 201 to maintain this conductor at a potential $V_x$ which is a predetermined value greater than the voltage occurring at terminal 155, to which the test line voltage is applied. This predetermined value may, for example, be 70 volts. The potential $V_x$ is applied to current mirror 301 to assure that the supply voltage to the current mirror is maintained at a level which is approximately 70 volts greater than the voltage level applied at terminal 155.

Since the output signal of operational amplifier 562 is proportional to the input voltage at terminal 155, the current flow through the transistor 566 is also proportional to voltage level at the input terminal 155. As current flows in the conductor 163, which interconnects the collector of transistor 566 and voltage source 201, a voltage drop will develop across the resistor 244 and resistor 567. This change in voltage is sensed at the operational amplifier 212 which causes a signal to be applied to operational amplifier 211 and consequently to transistor 210 which has its base terminal connected to the output terminal operational amplifier 211. As the current flow through transistor 210 is varied, the voltage drop across the connected resistor 215 will vary proportionately causing the potential $V_x$ on conductor 182 to change relative to the collector voltage of transistor 210. The collector voltage may, for example, be +300 volts derived from source 179 to which it is connected. It will be apparent from the above with reference to FIG. 2, that a decrease of the voltage applied to terminal 155 will result in an increased signal being applied to the base of transistor 566 which in turn causes a decreased signal to be applied to the base terminal of transistor 210. This will diminish the current flow through the transistor 210 causing the potential $V_x$ on conductor 182 to be decreased. Similarly, an increase in voltage at terminal 155 will cause a increase in $V_x$.

A diode 230 connects the conductor 182 to a voltage source 232 which may have a positive potential of, for example, 25 volts. This arrangement assures that the voltage $V_x$ will always have a positive value. The resistors 220 and 222 shown in FIG. 2 are a voltage divider and their midpoint provides a reference for the operational amplifier 211. Representative, the values of the resistors in FIG. 2 are as follows: resistor 220 approximately 1,000,000 ohms; resistor 222 approximately 25,000 ohms; resistor 224 approximately 10,000 ohms; resistor 215 approximately 2000 ohms; resistor 567 approximately 15,000 ohms. The values of the resistors 224 and 567 together with the value of the voltage source 569 control to a large extent the value of $V_x$. In one arrangement, the value of the source 569 was selected to be −9.32 volts, the resistor 567 was selected to be 15,400 ohms and the resistor 224 was selected to be 10,500 ohms.

The controlled voltage level $V_x$ on conductor 182 serves as a reference potential for floating power supply 202, shown in FIG. 1, in providing power at voltage level $V_x + \Delta$ on conductor 181 and $V_x - \Delta$ on conductor 183. These last named conductors are used to supply power to operational amplifiers 211 and 212 of the controlled voltage source 201 and operational amplifiers 310, 312, 314, and 316 of current mirror 301 shown in FIG. 3. Accordingly, these operational amplifiers are floating with respect to ground potential since their supply voltages vary as $V_x$ on conductor 182 varies. The potential represented by $\Delta$ may, for example, be 15 volts so that the operational amplifiers are provided with supply voltages equal to $V_x$ plus 15 volts and $V_x$ minus 15 volts. The floating power supply may be any standard power supply capable of delivering the required power to drive the operational amplifiers and which may be referenced to a potential such as $V_x$.

The current mirror 301 and level shifter 401 are shown in greater detail in FIG. 3. The current mirror 301 is responsive to a control current in conductor 350 to generate a proportional output current in conductor 157 which is connected to test line 105. The control current is regulated by the level shifter 401 which includes the pair of transistors 420 and 430. Transistor 430 is provided to prevent any unstable circuit condition due to positive feedback introduced by the circuits connected between the base and emitter of transistor 420. The collector of transistor 430 may be connected to a source of potential 431 of, for example, negative 12 volts.

The function of a level shifter 401 is to force terminal node 156 to be at virtual ground. This is accomplished by connecting this terminal via conductor 411 to the negative input terminal of the operational amplifier 412, which has its positive input terminal referenced to ground. The output signal of amplifier 412 controls the base currents to transistors 420 and 430. Terminal node 156 is also connected to divider/multiplier 550 via resistor R1 and to potential source 177 through resistor R2. Since node 156 is maintained at a constant potential, current in resistor R2 will be constant and line voltage variations on test line 105 will be reflected as current variations in resistor R1. Furthermore, level shifter 401 must provide a compensating current to node 156 to offset the current variations in R1. The base current required by either transistor 420 or 430 to produce the compensating current is provided by operational amplifier 412.

The operational amplifiers 414 and 416 are provided to sense the base current flowing through resistor 413 and causes corresponding current to flow in resistor 417. In this manner, this circuit arrangement cancels the effect of the addition of base current to the collector current, resulting from normal transistor operations, and assures that the current mirror control current in conductor 350 is substantially identical to the compensating current provided to terminal node 156.

Operational amplifier 410 is incorporated in the circuit to provide accurate control of the current flow in conductor 350. Preferably, the operational amplifiers 410, 412, 414, and 416 are of one integrated circuit device. The operational amplifier 410 is selected to generate an output signal which is proportional to its input offset voltage and current. Such offset voltage and current is present in any operational amplifier due to imperfections in the circuit. However, when several operational amplifiers are on the same integrated chip it may be assumed that the imperfections are similar and that the offset of all of the operational amplifiers will be approximately the same. By proper selection of values for input resistor 402, feedback resistor 404, and output resistor 406, operational amplifier 410 will produces an output current, proportional to its offset, which is added to current in conductor 411 to compensate for the offset of the other operational amplifiers in the level shifter. In one circuit arrangement, the values of resistors 402, 404, and 406 shown connected to amplifier 410 were chosen to be 6000, 19,000, and 9840 ohms, respectively.

Current flow in conductor 350 is sensed by the operational amplifier 316, which has its plus input terminal connected to the conductor 350 and its minus input terminal connected to the emitter of current mirror output transistor 320 and which controls the base current of the transistor 320. The values of the circuit components are chosen such that the current flowing in transistor 320 and resistors 341 and 343 to the test line via conductor 157 is twice as great as the current flowing in conductor 350. Thus, the circuit acts as a current doubler.

The current mirror 301 comprises four operational amplifiers, 310, 312, 314, and 316 to obtain a highly accurate circuit. The three operational amplifiers preferably are part of the same integrated circuit. The operational ammplifier 310 is provided for the purpose of generating a signal which is proportional to its input offset voltage and current. This signal is intended to cancel the corresponding imperfections of operational amplifiers 312, 314, and 316. Operational amplifiers 312 and 314 are used to sense the base current of transistor 320. By means of these operational amplifiers, a current equal to the base current is added to the emitter current of the PNP transistor 320. In a PNP transistor, the collector current equals the emitter current minus the base current, and by increasing the emitter current by an appropriate amount, the resultant collector current is made equal to the original emitter current. The current drain caused by bias currents in conductors 321 and 323, connected to operational amplifiers 314 and 316, respectively, and load current on plus terminal of amplifier 316 are canceled by operational amplifier 310. In one circuit configuration, the resistors 331, 333, 335, 337, 339, and 341 are of equal value and are selected to be 3000 ohms. In the same circuit configuration the resistors 313 and 325 are selected to be 6000 ohms and the resistor 311 is selected to be 2000 ohms. The operational amplifiers in the current mirror and the other amplifiers used in this circuit may be any standard operational amplifier, such as are commercially available.

The zener diodes 342 and 344 in the current mirror of FIG. 3 together with the diodes 346 and 348 and capacitor 349 and resistor 343 comprise an output protection circuit. The capacitor 349 and resistor 343 comprise an RC circuit designed to prevent the collector of transistor 320 from changing faster than $V_x$ and, thereby, prevent transients in the emitter to collector voltage from exceeding safe limits. The resistor 343 also limits the current in the case of large negative transients on the test line. The diode 348 prevents reverse currents in the transistor in the event that the test line voltage exceeds $V_x$ due to a transient condition. The two zener diodes 342 and 344 may be chosen, for example, to be 100 volt zeners. These zener diodes together with diode 346 serve to clamp the collector of the transistor at a $-200$ volts during large negative transients which might occur on the test line.

It is to be understood that the above-described arrangement is merely an illustrative application of the principles of the invention; numerous other arrangements may be devised by those skilled in the art without departing from the spirit and scope of the invention.

What is claimed is:

1. A negative impedance circuit having an input terminal (155) connectible between a source of potential and an electrical load connected to said source, characterized in that said circuit comprises:
    a controllable current generating circuit (301) connected to said input terminal for providing an output current to said input terminal;
    a current control circuit (401) connected to said current generating circuit and said input terminal and responsive to a potential applied to said input terminal to control said current generating circuit to provide to said input terminal an output current having a magnitude directly proportional to the level of said applied potential.

2. A negative impedance circuit in accordance with claim 1 characterized in that said circuit further comprises level adjusting means (550) connected between said input terminal and said current control circuit for applying to said current control means an adjusted potential having a level proportional to the level of said applied potential and said current control circuit comprises means (420) responsive to said adjusted potential to control said current generating circuit to provide said output current having a magnitude directly proportional to the level of said applied potential.

3. A negative impedance circuit in accordance with claim 2 characterized in that said negative impedance circuit further comprises means (R3, 131, 132) for measuring said output current generated by said controllable current generating circuit and means (520-527) for selectively adjusting said level adjusting circuit to a specified ratio.

4. A negative impedance circuit in accordance with claim 3 characterized in that said level adjusting means comprises an adjustable voltage divider circuit (510-517) and amplifier means (562).

5. A negative impedance circuit in accordance with claim 3 characterized in that said means for measuring said output current comprises an operational amplifier (131) having a calibration resistor (R3) connected in a feedback mode and a comparator circuit (132).

6. A negative impedance circuit in accordance with claim 1 characterized in that said negative impedance circuit further comprises an internal source of potential (177), said controllable current generator circuit comprises means (316, 320) responsive to a control current to generate said output current in direct proportion to said control current, and said current control circuit comprises current flow control means (412, 420) for controlling said control current and connected to said input terminal and said internal source of potential at a common mode (156), whereby said current control circuit increases or decreases said control current in direct proportion to the increase or decrease in said applied voltage relative to said internal source.

7. A negative impedance circuit in accordance with claim 6 characterized in that said negative impedance circuit comprises level adjusting means (550) connected between said input terminal and said common node for supplying to said node an output current proportional to the level of said applied voltage, and said current flow control means comprises transistor circuit means (420) responsive to said output current to generate said control current proportional to said output current.

8. A negative impedance circuit in accordance with claim 7 characterized in that said transistor circuit means comprises a transistor having a first terminal connected to said controllable current generating circuit and having a second terminal connected to said common node, and said current control means further comprises operational amplifier means (412) having one input terminal connected to a reference potential and another input terminal connected to said second terminal and having an output terminal connected to the base terminal of said transistor, whereby said common node is kept at a substantially fixed potential.

9. A negative impedance circuit in accordance with claim 8 characterized in that said current control circuit further comprises means (414, 416) for sensing the magnitude of base current to said transistor and for drawing from said second output terminal a current of a magnitude substantially equal to that of the base current, whereby said control current is substantially equal to current supplied to said common node independent of the magnitude of said base current.

10. A negative impedance circuit in accordance with claim 8 or claim 9 characterized in that said current control circuit further comprises voltage offset circuitry (402, 404, 406, 410) for compensating for voltage level offset of circuit components of said current control circuit.

11. A negative impedance circuit in accordance with claim 1 characterized in that said controllable current generating circuit comprises transistor circuit means (316, 320) for generating said output current proportional to the magnitude of a control current, and said current control circuit comprises means (420) for controlling said control current.

12. A negative impedance circuit in accordance with claim 11 wherein said transistor circuit means comprises a transistor (320) having an output terminal connected to said input terminal of said negative impedance circuit means and amplifier means (316) having an input terminal connected to said means for controlling said control current and an output terminal connected to the base terminal of said transistor, whereby said transistor is controlled to generate said output current in proportion to the magnitude of said control current.

13. A negative impedance circuit in accordance with claim 11 characterized in that said transistor circuit means comprises a transistor (320) having a base terminal, an emitter terminal, and a collector terminal, said controllable current generating circuit further comprises means (312, 314) for sensing base current applied to said base terminal and for supplying a current substantially equal in magnitude to said base current, whereby the collector current of said transistor is substantially equal to its emitter current, independent of the magnitude of its base current.

14. A negative impedance circuit in accordance with claim 12 or claim 13 characterized in that said controllable current generating circuit further comprises voltage offset circuitry (310, 311, 313, 325) for compensating for a voltage level offset of circuit components of said controllable current generating circuit.

15. A negative impedance circuit in accordance with claim 1 characterized in that said negative impedance circuit further comprises a power source (179, 201, 202) responsive to the level of potential at said input terminal to provide to said controllable current generating circuit a potential level which differs from said potential level at said input terminal by a predetermined value.

16. A negative impedance circuit in accordance with claim 15 characterized in that said power source comprises a source of potential (179), a power supply circuit connected to said controllable current generating circuit (202), and a voltage level control circuit (201) connected to said source of potential, said power supply circuit and said input terminal and responsive to the level of potential applied at said input terminal for maintaining the potential level of said power supply at a level which differs from said applied potential by a predetermined amount.

17. A negative impedance circuit having an input terminal (155) connectible between a source of potential and an electrical load connected to said source comprising:
- a controllable current generating circuit (301) connected to said input terminal and responsive to a control current for providing to said input terminal an output current proportional to said control current;
- a level adjusting means (550) connected to said input terminal and reponsive to a potential applied to said input terminal to generate an adjusted potential signal having a level proportional to the level of said applied potential;
- current control circuit means (401) connected to said controllable current generating circuit and said level adjusting means and responsive to said adjusted potential signal to generate said control current proportional to the level of said adjusted potential.

18. A negative impedance circuit in accordance with claim 17 wherein said negative impedance circuit further comprises means (131, 132) for measuring said output current generated by said controllable current generator and means (520–527) for selectively adjusting said level adjusting circuit to generate an adjusted potential having a specified ratio to said applied potential.

19. A negative impedance circuit in accordance with claim 17 wherein said negative impedance circuit further comprises a source of potential (179), an output power supply (202) connected to said controllable current generating circuit, and means (201) responsive to said applied potential for controlling the potential level of said output power supply to be at a level which differs from the level of said applied potential by a predetermined amount.

* * * * *